US012699714B2

(12) United States Patent
Wang et al.

(10) Patent No.: US 12,699,714 B2
(45) Date of Patent: Aug. 4, 2026

(54) PERFORMING DIGITAL FILE ANALYSIS USING GRAPH-BASED REPRESENTATIONS AND MACHINE LEARNING TECHNIQUES

(71) Applicant: Dell Products L.P., Round Rock, TX (US)

(72) Inventors: Zijia Wang, London (GB); Qiang Chen, Shanghai (CN); Jing Yu, Shanghai (CN); Zhen Jia, Shanghai (CN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/920,039

(22) Filed: Oct. 18, 2024

(65) Prior Publication Data

US 2026/0111451 A1     Apr. 23, 2026

(51) Int. Cl.
*G06F 16/28*          (2019.01)
*G06F 16/16*          (2019.01)
(Continued)

(52) U.S. Cl.
CPC ............ *G06F 16/288* (2019.01); *G06F 16/16* (2019.01); *G06F 16/9024* (2019.01); *G06N 3/042* (2023.01); *G06N 3/088* (2013.01)

(58) Field of Classification Search
CPC .... G06F 16/288; G06F 16/16; G06F 16/9024; G06N 3/042; G06N 3/088
(Continued)

(56) References Cited

U.S. PATENT DOCUMENTS

2008/0133446 A1* 6/2008 Dubnicki ............ G06F 16/1752
2018/0039907 A1* 2/2018 Kraley ..................... G06N 5/02
(Continued)

FOREIGN PATENT DOCUMENTS

WO      WO-2025081021 A1 * 4/2025 ............. G06N 20/00

OTHER PUBLICATIONS

Liu et al. (2023). Arbitrary Point Cloud Upsampling Via Dual Back-Projection Network. In 2023 IEEE International Conference on Image Processing (ICIP) (pp. 1470-1474).
(Continued)

*Primary Examiner* — Hicham Skhoun
(74) *Attorney, Agent, or Firm* — Ryan, Mason & Lewis, LLP

(57)          ABSTRACT
Methods, apparatus, and processor-readable storage media for performing digital file analysis using graph-based representations and machine learning techniques are provided herein. An example computer-implemented method includes segmenting at least one digital file into multiple variable-sized portions; determining one or more content-based relationships across at least a portion of the multiple variable-sized portions of the at least one digital file; generating at least one graph representation of the at least one digital file based on the one or more content-based relationships and the at least a portion of the multiple variable-sized portions of the at least one digital file; processing one or more portions of the at least one graph representation using one or more machine learning techniques; and analyzing the at least one digital file based on results of processing the one or more portions of the at least one graph representation using the one or more machine learning techniques.

15 Claims, 6 Drawing Sheets

(51) Int. Cl.
 G06F 16/901 (2019.01)
 G06N 3/042 (2023.01)
 G06N 3/088 (2023.01)

(58) Field of Classification Search
 USPC ........................................................ 707/741
 See application file for complete search history.

(56) References Cited

U.S. PATENT DOCUMENTS

| | | | | |
|---|---|---|---|---|
| 2021/0073178 | A1* | 3/2021 | Yin | G06F 16/1752 |
| 2022/0027373 | A1* | 1/2022 | Trenkle | G06F 16/242 |
| 2022/0187847 | A1* | 6/2022 | Cella | G06Q 10/06 |
| 2022/0335307 | A1* | 10/2022 | Wang | G06N 5/02 |
| 2024/0013562 | A1* | 1/2024 | Montero | G06V 30/19187 |
| 2024/0096125 | A1* | 3/2024 | Yebes Torres | G06N 3/042 |
| 2025/0094708 | A1* | 3/2025 | Cunningham | G06F 40/30 |

OTHER PUBLICATIONS

Liu et al. (2023). Soft-IntroVAE for Continuous Latent Space Image Super-Resolution. In 2023 IEEE International Conference on Image Processing (ICIP) (pp. 1460-1464).

Paul et al., A Resource-Aware Nearest-Neighbor Search Algorithm for K-Dimensional Trees, Conference on Design and Architectures for Signal and Image Processing, 2013.

Wang et al. (2022). Gift from nature: Potential Energy Minimization for explainable dataset distillation. In Proceedings of the Asian Conference on Computer Vision (pp. 235-250).

Wang et al. (2022). Object Centric Point Sets Feature Learning with Matrix Decomposition. In Proceedings of the Asian Conference on Computer Vision (pp. 251-264).

Wang et al. (2022). Potential Energy based Mixture Model for Noisy Label Learning. In Advances in Neural Information Processing Systems 36 (pp. 33795-33805).

Wang et al. (2024). StyleMamba: State Space Model for Efficient Text-driven Image Style Transfer. arXiv preprint arXiv:2405.05027.

Wang et al. (2023). The Oil and Water Separation Phenomenon Inspired Loss for Feature Learning. In 2023 IEEE International Conference on Image Processing (ICIP) (pp. 1510-1514).

Wang et al. (2022). Uncertainty-aware self-training with expectation maximization basis transformation. In Advances in Neural Information Processing Systems 36.

Yang et al. (2022). A low-rank tensor bayesian filter framework for multi-modal analysis. In 2022 IEEE International Conference on Image Processing (ICIP) (pp. 3738-3742).

Zhou et al. "TransVOD: End-to-End Video Object Detection with Spatial-Temporal Transformers". In: IEEE Transactions on Pattern Analysis and Machine Intelligence (2022).

Amirani et al., A New Approach to Content-based File Type Detection, Proceedings of the 13th IEEE Symposium on Computers and Communications (ISCC'08), pp. 1103-1108, Jul. 2008.

Xiang et al. "MTN: Forensic Analysis of MP4 Video Files Using Graph Neural Networks". Proceedings of the IEEE/CVF Conference on Computer Vision and Pattern Recognition (CVPR) Workshops, 2023, pp. 963-972.

Iscen et al., Graph convolutional networks for learning with few clean and many noisy labels, arXiv:1910.00324, Oct. 2019.

Busch et al., NF-GNN: Network Flow Graph Neural Networks for Malware Detection and Classification, arXiv:2103.03939, Jun. 4, 2021.

* cited by examiner

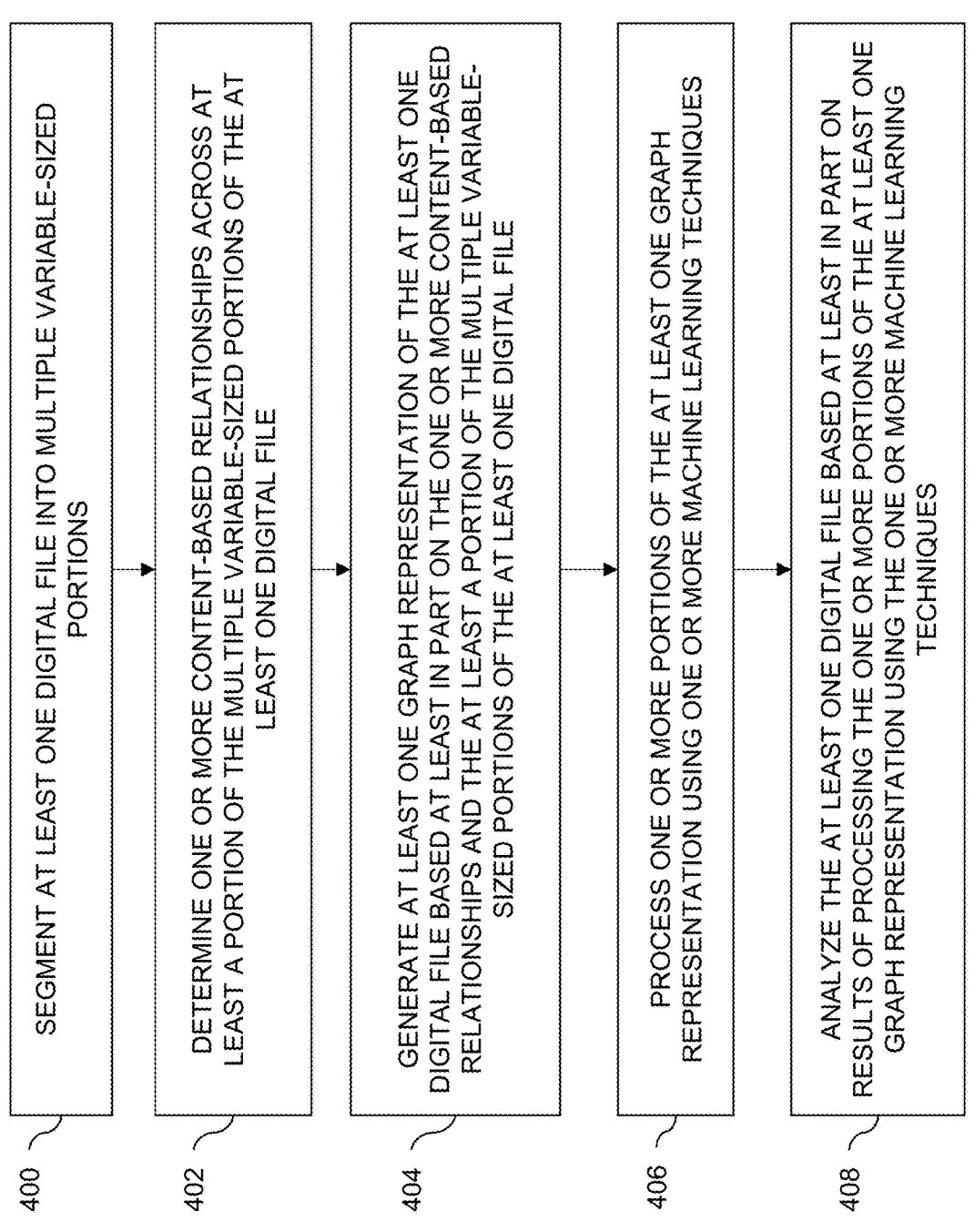

400   SEGMENT AT LEAST ONE DIGITAL FILE INTO MULTIPLE VARIABLE-SIZED PORTIONS

402   DETERMINE ONE OR MORE CONTENT-BASED RELATIONSHIPS ACROSS AT LEAST A PORTION OF THE MULTIPLE VARIABLE-SIZED PORTIONS OF THE AT LEAST ONE DIGITAL FILE

404   GENERATE AT LEAST ONE GRAPH REPRESENTATION OF THE AT LEAST ONE DIGITAL FILE BASED AT LEAST IN PART ON THE ONE OR MORE CONTENT-BASED RELATIONSHIPS AND THE AT LEAST A PORTION OF THE MULTIPLE VARIABLE-SIZED PORTIONS OF THE AT LEAST ONE DIGITAL FILE

406   PROCESS ONE OR MORE PORTIONS OF THE AT LEAST ONE GRAPH REPRESENTATION USING ONE OR MORE MACHINE LEARNING TECHNIQUES

408   ANALYZE THE AT LEAST ONE DIGITAL FILE BASED AT LEAST IN PART ON RESULTS OF PROCESSING THE ONE OR MORE PORTIONS OF THE AT LEAST ONE GRAPH REPRESENTATION USING THE ONE OR MORE MACHINE LEARNING TECHNIQUES

FIG. 4

PERFORMING DIGITAL FILE ANALYSIS USING GRAPH-BASED REPRESENTATIONS AND MACHINE LEARNING TECHNIQUES

BACKGROUND

File analysis is a task involved in numerous applications and domains. However, conventional file analysis techniques typically fail to identify content similarities in the presence of file modifications and/or fail to capture particular structural or semantic information, and often rely on computationally expensive methods which require large amounts of labeled data.

SUMMARY

Illustrative embodiments of the disclosure provide techniques for performing digital file analysis using graph-based representations and machine learning techniques.

An exemplary computer-implemented method includes segmenting at least one digital file into multiple variable-sized portions, and determining one or more content-based relationships across at least a portion of the multiple variable-sized portions of the at least one digital file. The method also includes generating at least one graph representation of the at least one digital file based at least in part on the one or more content-based relationships and the at least a portion of the multiple variable-sized portions of the at least one digital file. Additionally, the method includes processing one or more portions of the at least one graph representation using one or more machine learning techniques, and analyzing the at least one digital file based at least in part on results of processing the one or more portions of the at least one graph representation using the one or more machine learning techniques.

Illustrative embodiments can provide significant advantages relative to conventional file analysis techniques. For example, problems associated with computationally expensive methods which require large amounts of labeled data are overcome in one or more embodiments through automatically analyzing digital files by processing generated graph representations of the digital files using machine learning techniques.

These and other illustrative embodiments described herein include, without limitation, methods, apparatus, systems, and computer program products comprising processor-readable storage media.

BRIEF DESCRIPTION OF THE DRAWINGS

FIG. 4 is a flow diagram of a process for performing digital file analysis using graph-based representations and machine learning techniques in an illustrative embodiment.

DETAILED DESCRIPTION

Illustrative embodiments will be described herein with reference to exemplary computer networks and associated computers, servers, network devices or other types of processing devices. It is to be appreciated, however, that these and other embodiments are not restricted to use with the particular illustrative network and device configurations shown. Accordingly, the term "computer network" as used herein is intended to be broadly construed, so as to encompass, for example, any system comprising multiple networked processing devices.

Figure 1:
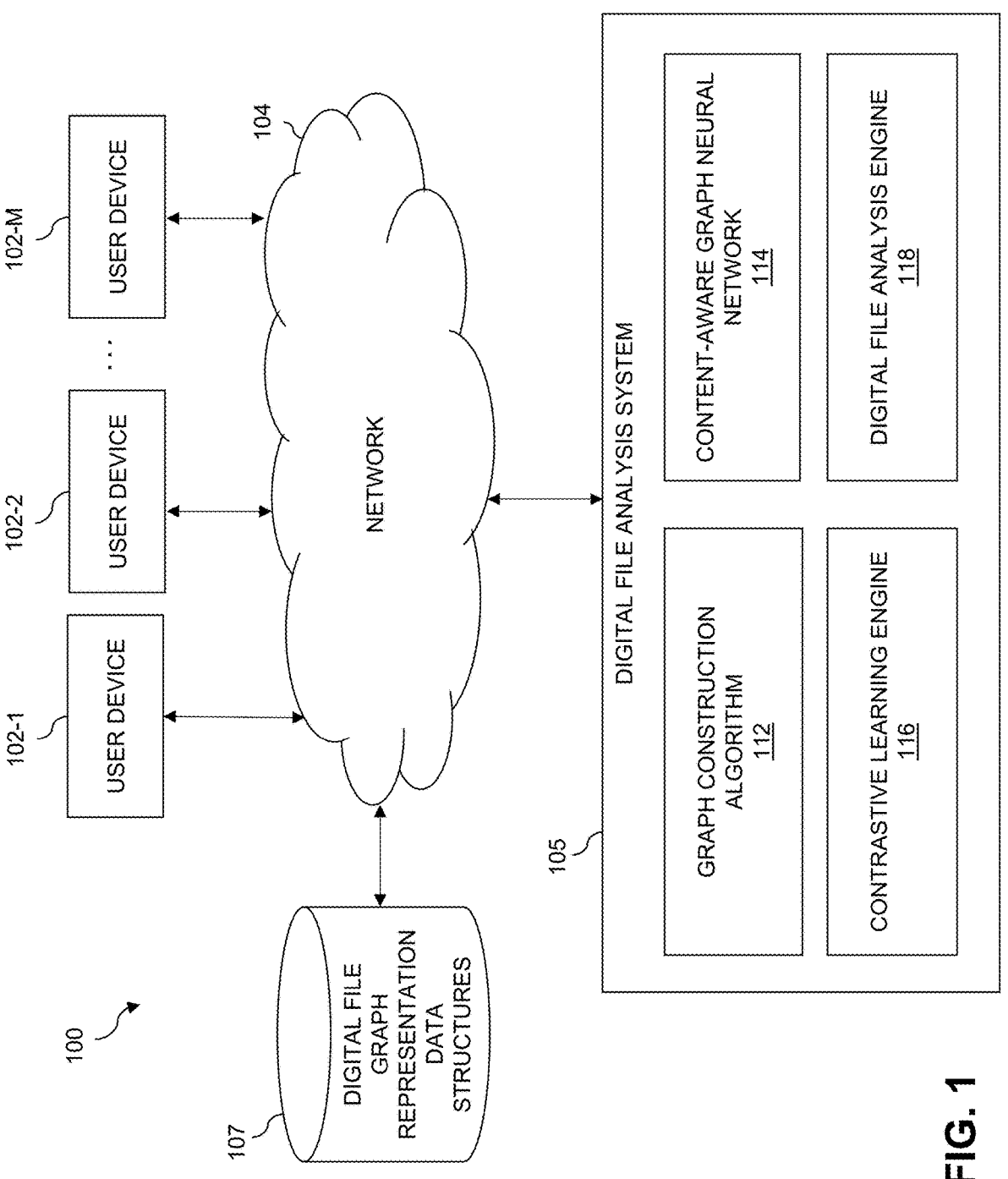
FIG. 1 shows an information processing system configured for performing digital file analysis using graph-based representations and machine learning techniques in an illustrative embodiment.

FIG. 1 shows a computer network (also referred to herein as an information processing system) 100 configured in accordance with an illustrative embodiment. The computer network 100 comprises a plurality of user devices 102-1, 102-2, . . . 102-M, collectively referred to herein as user devices 102. The user devices 102 are coupled to a network 104, where the network 104 in this embodiment is assumed to represent a sub-network or other related portion of the larger computer network 100. Accordingly, elements 100 and 104 are both referred to herein as examples of "networks" but the latter is assumed to be a component of the former in the context of the FIG. 1 embodiment. Also coupled to network 104 is digital file analysis system 105.

The user devices 102 may comprise, for example, mobile telephones, laptop computers, tablet computers, desktop computers or other types of computing devices. Such devices are examples of what are more generally referred to herein as "processing devices." Some of these processing devices are also generally referred to herein as "computers."

The user devices 102 in some embodiments comprise respective computers associated with a particular company, organization or other enterprise. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

Also, it is to be appreciated that the term "user" in this context and elsewhere herein is intended to be broadly construed so as to encompass, for example, human, hardware, software or firmware entities, as well as various combinations of such entities.

The network 104 is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a Wi-Fi or WiMAX network, or various portions or combinations of these and other types of networks. The computer network 100 in some embodiments therefore comprises combinations of multiple different types of networks, each comprising processing devices configured to communicate using internet protocol (IP) or other related communication protocols.

Additionally, the digital file analysis system 105 can have one or more digital file graph representation data structures 107 configured to store data pertaining to generated graph representations of one or more digital files and data related thereto, including, for example, content-based relationship data associated with one or more digital files, segmentation data associated with one or more digital files, augmented and/or modified data associated with one or more digital file graph representations, etc. The term "data structure," as used herein, is intended to be broadly construed, so as to encompass, for example, a wide variety of different types of tables, arrays, graphs, trees, linked lists, and additional or alternative data relation mechanisms, as well as portions or combinations thereof. Accordingly, a given data structure can comprise a combination of multiple smaller data structures, possibly of different types, or a portion of a larger data structure. Numerous other arrangements are possible.

The digital file graph representation data structures 107 in the present embodiment are implemented using one or more storage systems associated with the digital file analysis system 105. Such storage systems can comprise any of a variety of different types of storage including network-attached storage (NAS), storage area networks (SANs), direct-attached storage (DAS) and distributed DAS, as well as combinations of these and other storage types, including software-defined storage.

Also associated with the digital file analysis system 105 are one or more input-output devices, which illustratively comprise keyboards, displays or other types of input-output devices in any combination. Such input-output devices can be used, for example, to support one or more user interfaces to the digital file analysis system 105, as well as to support communication between the digital file analysis system 105 and other related systems and devices not explicitly shown.

Additionally, the digital file analysis system 105 in the FIG. 1 embodiment is assumed to be implemented using at least one processing device. Each such processing device generally comprises at least one processor and an associated memory, and implements one or more functional modules for controlling certain features of the digital file analysis system 105.

More particularly, the digital file analysis system 105 in this embodiment can comprise a processor coupled to a memory and a network interface.

The processor illustratively comprises a microprocessor, a central processing unit (CPU), a graphics processing unit (GPU), a tensor processing unit (TPU), a microcontroller, an application-specific integrated circuit (ASIC), a field-programmable gate array (FPGA) or other type of processing circuitry, as well as portions or combinations of such circuitry elements.

The memory illustratively comprises random access memory (RAM), read-only memory (ROM) or other types of memory, in any combination. The memory and other memories disclosed herein may be viewed as examples of what are more generally referred to as "processor-readable storage media" storing executable computer program code or other types of software programs.

One or more embodiments include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals. These and other references to "disks" herein are intended to refer generally to storage devices, including solid-state drives (SSDs), and should therefore not be viewed as limited in any way to spinning magnetic media.

The network interface allows the digital file analysis system 105 to communicate over the network 104 with the user devices 102, and illustratively comprises one or more conventional transceivers.

The digital file analysis system 105 further comprises graph construction algorithm 112, content-aware graph neural network 114, contrastive learning engine 116, and digital file analysis engine 118.

As further detailed herein, in one or more embodiments graph construction algorithm 112 creates a comprehensive graph representation of a given digital file, which is then analyzed by content-aware graph neural network 114, which processes content-based and structure-based information within the given digital file. In such an embodiment, content-aware graph neural network 114 can be trained in an unsupervised manner using contrastive learning engine 116, enabling the content-aware graph neural network 114 to work in conjunction with digital file analysis engine 118 to distinguish between similar and dissimilar files, and/or portions thereof.

It is to be appreciated that this particular arrangement of elements 112, 114, 116 and 118 illustrated in the digital file analysis system 105 of the FIG. 1 embodiment is presented by way of example only, and alternative arrangements can be used in other embodiments. For example, the functionality associated with elements 112, 114, 116 and 118 in other embodiments can be combined into a single module, or separated across a larger number of modules. As another example, multiple distinct processors can be used to implement different ones of elements 112, 114, 116 and 118 or portions thereof.

At least portions of elements 112, 114, 116 and 118 may be implemented at least in part in the form of software that is stored in memory and executed by a processor.

It is to be understood that the particular set of elements shown in FIG. 1 for performing digital file analysis using graph-based representations and machine learning techniques involving user devices 102 of computer network 100 is presented by way of illustrative example only, and in other embodiments additional or alternative elements may be used. Thus, another embodiment includes additional or alternative systems, devices and other network entities, as well as different arrangements of modules and other components. For example, in at least one embodiment, two or more of digital file analysis system 105, digital file graph representation data structures 107, and user devices 102 can be on and/or part of the same processing platform.

An exemplary process utilizing elements 112, 114, 116 and 118 of an example digital file analysis system 105 in computer network 100 will be described in more detail with reference to the flow diagram of FIG. 4.

Accordingly, at least one embodiment includes generating and/or implementing at least one precomputed similarity index of digital files in data protection systems using at least one content-aware graph neural network. In one or more backup systems, exact file searches can be efficient with underlying hash indices for all relevant data chunks and the Merkle trees from a chunk-to-file system. A property of hash functions used in such a backup system is that a small change in the input can lead to significantly different outputs, which can help to distribute the data across available storage systems and/or devices. Additionally or alternatively, fuzzy content searching by partial matching can be carried out without such hash indices. Accordingly, as detailed herein, one or more embodiments include implementing techniques for capturing structural and/or semantic nuances inherent in digital files.

Figure 2:
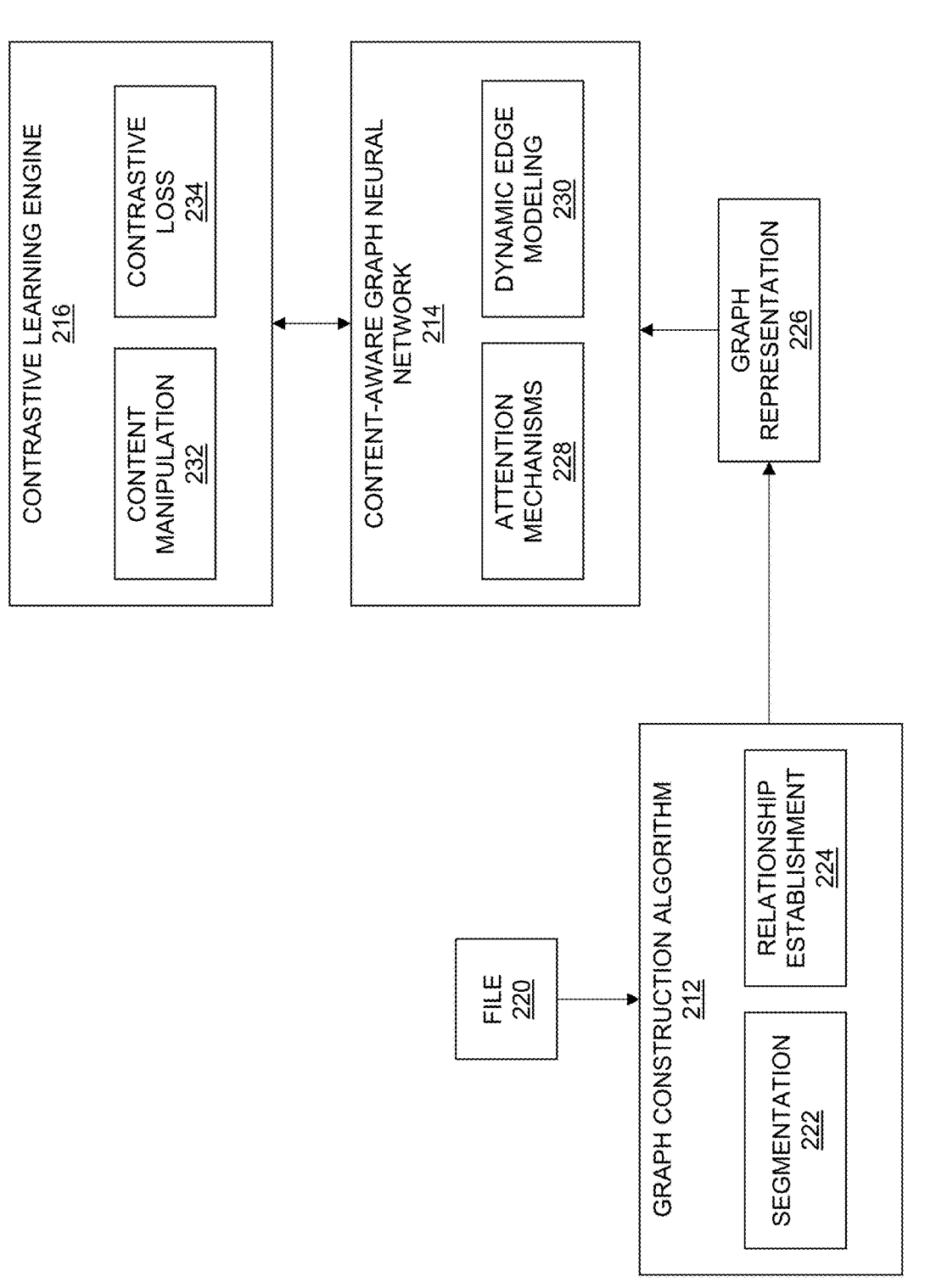
FIG. 2 shows an example workflow in an illustrative embodiment.

FIG. 2 shows an example workflow in an illustrative embodiment. By way of illustration, FIG. 2 depicts an example workflow for transforming file analysis by leveraging graph-based representations and neural network processing. More particularly, FIG. 2 depicts graph construction algorithm 212 processing file 220, including performing, in step 222, segmentation of file 220 into variable-size chunks and establishing, in step 224, one or more content-based relationships among the variable-size chunks. Based at least in part on the one or more content-based relationships among the variable-size chunks, graph construction algorithm 212 creates a comprehensive graph representation 226 of file 220. This graph representation 226 is then analyzed by content-aware graph neural network 214, which includes a graph neural network architecture that integrates attention mechanisms 228 and dynamic edge modeling 230 to capture and encode the interplay of content and structure within file 220.

Additionally, one or more embodiments include training content-aware graph neural network 214 in an unsupervised manner by implementing contrastive learning engine 216, which includes performing content manipulation in step 232 and a contrastive loss function in step 234, enabling the content-aware graph neural network 214 to distinguish between similar and dissimilar files, and/or portions thereof, with enhanced precision. For example, such an embodiment can include employing contrastive learning engine 216 in connection with augmenting one or more portions of content of file 220 (via content manipulation in step 232), facilitating the generation of robust, meaningful file embeddings without the need for labeled data. The file embeddings, which capture portions of the structural and semantic information of graph representation 226, can then be used to train content-aware graph neural network 214. Accordingly, and as further detailed herein, such an embodiment can include enhancing the representation, processing, and analysis of digital files across various formats, ensuring an understanding of file structure and content.

In at least one embodiment, graph construction algorithm 212 enables the transformation of original file data (e.g., from file 220) into a structured graph representation (e.g., graph representation 226) that captures variable-size chunks of data and content-based relationships within and/or across the data. In such an embodiment, variable-size chunking techniques are used to segment files (e.g., file 220) into chunks wherein the size of each chunk is determined dynamically based at least in part on the content of the file. Variable-size chunking techniques can allow for the segmentation of files to align more closely with the natural boundaries and/or structures within the data, such as, for example, paragraphs in text files, scenes in video files, etc.

Further, in one or more embodiments, variable-size chunking techniques include using at least one rolling hash function to identify one or more chunk boundaries. Using such a function involves moving a window of a certain size (m) through the file from beginning to end, and calculating a hash value for the contents of the window at each step. When the hash value meets a specific condition, such as matching a predetermined pattern, falling within a certain range, etc., a boundary is marked and a chunk is defined.

More particularly, such variable-size chunking techniques can include performing an initialization step which includes selecting a window size (m) and a base (d) for the hash calculation. The base can correspond, for example, to the size of the corresponding alphabet (e.g., 256 for bytes). A subsequent step includes performing a rolling hash calculation, wherein for each position (i) in the file, the hash value (H) of the window ending at that position is calculated using Equation (1) as follows:

$$H(i) = (d \cdot H(i-1) - \text{file } [i-1] \cdot d^m + \text{file } [i+m-1]) \bmod q \qquad (1)$$

wherein H(i−1) represents the hash value of the previous window, file [i−1] represents the byte value at the start of the previous window, file [i+m−1] represents the byte value at the end of the current window, mod represents the modulo operator, and q is a prime number used to ensure the hash value stays within manageable limits.

Variable-size chunking techniques can also include boundary detection, wherein a boundary is detected whenever the hash value satisfies at least one predetermined condition. Such a condition can include, for example, the hash value ending in a specific digit or pattern, which statistically occurs at the desired chunking frequency. Once a boundary is detected, the file is segmented at that point, and the above steps of the variable-size chunking techniques are repeated and/or iterated until a designated portion of the file (e.g., the entire file) has been traversed, resulting in a series of variable-size chunks.

As also detailed in connection with FIG. 2, one or more embodiments include establishing one or more content-based relationships as part of the graph construction algorithm. In such an embodiment, content-based relationships can be established by evaluating the similarity between two or more chunks. The similarity can be quantified through one or more metrics, such as, e.g., cosine similarity. By way of example, using cosine similarity to compare feature vectors derived from chunks can be represented via Equation (2) as follows:

$$\text{similarity}(X, Y) = \frac{X \cdot Y}{\|X\| \|Y\|} \qquad (2)$$

wherein X and Y represent feature vectors of two chunks, · denotes the dot product, and ‖X‖ and ‖Y‖ represent the norms of vectors X and Y.

As also detailed herein, a content-aware graph neural network, used in one or more embodiments, addresses intricacies of file graph representations, focusing on the above-noted variable-size chunks and content-based relationships. Such a content-aware graph neural network includes multiple layers, each designed to process and aggregate information from the graph representation of a file. The layers can include, for example, an input layer, which accepts node features derived from chunk content, including statistical properties, embeddings, hash-based representations, etc. The layers also include one or more graph convolutional layers, which can be modified to perform weighted aggregation based at least in part on edge similarity scores and the relative sizes of the connecting chunks. This facilitates nuanced integration of content and structural information. Additionally, the layers can include one or more attention mechanisms, which dynamically weight the contribution of neighboring nodes, focusing on the most relevant content for embedding generation. Further, the layers can include at least one pooling layer, which aggregates node features across the graph representation to produce a comprehensive embedding for at least a portion of the file (e.g., the entire file). In at least one embodiment, a pooling layer is designed to adaptively prioritize features based on their significance.

To accommodate variable-size chunks and enhance content-based relationship encoding, a variable graph convolutional operation can be redefined via Equation (3) as follows:

$$h_v^{(l+1)} = \sigma \left( \sum_{u \in N(v)} \beta_{uv} \omega_{uv} W^{(l)} h_u^{(l)} + b^{(l)} \right) \qquad (3)$$

wherein $\beta_{uv}$ represents a size-aware weighting factor, calculated based on the relative sizes of chunks u and v, ensuring that larger chunks exert proportional influence, $$h_u^{(l)}$$

represents the feature vector of node $v_u$ at layer l, $\mathcal{N}$ (v) denotes the set of neighbors of v, W is a learnable weight matrix applied to the node features, $b^{(l)}$ is a learnable weight, $\sigma$ represents an activation function, and wherein $\omega_{uv}$ represents an enhanced content-similarity weight, incorporating direct similarity and contextual relevance within the graph structure. In one or more embodiments, such a variable graph convolutional operation ensures that both the physical size of the chunks and their semantic content influence the embedding process, creating a more nuanced representation of the file(s).

As noted above and herein, one or more embodiments include implementing at least one enhanced attention mechanism, which includes using a context-aware weighting factor in connection with the calculation of attention coefficients ($\alpha_{uv}$), such as detailed in Equation (4) as follows:

$$\alpha_{uv} = \frac{\exp\left(LeakyReLU\left(a^T[Wh_u \| Wh_v] + c_{uv}\right)\right)}{\sum_{k \in N(v)} \exp\left(LeakyReLU\left(a^T[Wh_u \| Wh_k] + c_{uk}\right)\right)} \quad (4)$$

wherein $c_{uv}$ represents the context-aware weight, derived from the global structure of the graph and the specific path(s) connecting chunks u and v, and wherein $c_{uk}$ represents the context-aware weight, derived from the global structure of the graph and the specific path(s) connecting chunks u and k, enhancing the model's ability to recognize the importance of nodes based at least in part on the overall graph topology. Also, in the above Equation (4), LeakyReLU signifies leaky rectified linear unit (ReLU), an activation function that allows a gradient for negative values (instead of noting such values as zero), $a^T$ is a learnable weight vector, W is a learnable weight matrix applied to the node features, $h_v$ represents the feature vector of chunk v, and $\|$ denotes concatenation.

Such an enhanced attention mechanism ensures that the embeddings generated by a context-aware graph neural network are sensitive to local node features and pairwise similarities, and also are sensitive to the global context within the graph, providing a more informative representation.

Figure 3:
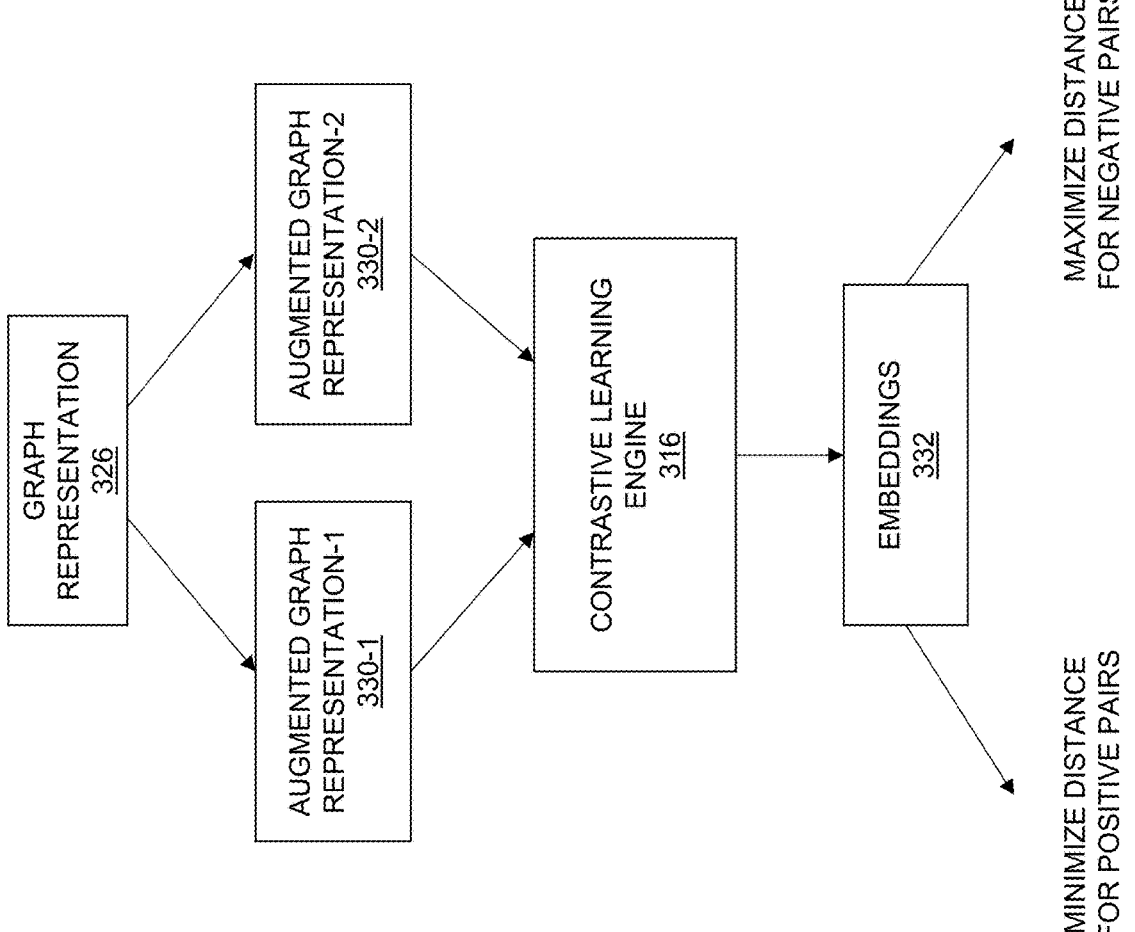
FIG. 3 shows an example contrastive learning training workflow in an illustrative embodiment.

As also detailed herein, one or more embodiments include implementing contrastive learning with content-specific modifications to train a context-aware graph neural network in an unsupervised manner. FIG. 3 shows an example contrastive learning training workflow in an illustrative embodiment. By way of illustration, FIG. 3 depicts a first augmented graph representation 330-1 and a second augmented graph representation 330-2, generated from graph representation 326 (e.g., using a graph construction algorithm) and processed by contrastive learning engine 316. More particularly, contrastive learning engine 316 leverages the structure and content information encoded in the augmented graph representations 330-1 and 330-2 to learn and/or determine one or more embeddings 332 that accurately represent semantic and structural relationships within and between files. Additionally, in one or more embodiments, objectives of the one or more embeddings 332 include minimizing distance values for positive pairs, and maximizing distance values for negative pairs.

Accordingly, contrastive learning, as used herein, refers to a technique in unsupervised machine learning that learns to encode similarities and differences between pairs of examples. In the context of a context-aware graph neural network, contrastive learning is adapted to work with graph representations of files in connection with content augmentation to enhance the learning process.

Content augmentation of graphs and/or portions thereof involves creating variations of original file graphs that preserve semantic meaning while introducing one or more perturbations. This can be achieved by modifying the graph structure (e.g., adding or removing edges based on content similarity thresholds) and/or one or more node features (e.g., perturbing chunk embeddings within a given range). Additionally, a contrastive learning framework for a context-aware graph neural network includes processing one or more embeddings of augmented graphs that originate from the same file (i.e., positive pairs) and push apart embeddings from different files (i.e., negative pairs). The objective in such an embodiment is to maximize the agreement (or distance) between embeddings of positive pairs while minimizing the agreement (or distance) for negative pairs.

As such, an objective function for contrastive learning in one or more embodiments can be defined via Equation (5) as follows:

$$L = -\log \frac{\exp\left(sim\left(z_i, z_j\right)/\tau\right)}{\sum_{k=1}^{N} \|/-_{[k \neq i]} \exp\left(sim\left(z_i, z_k\right)/\tau\right)} \quad (5)$$

wherein $z_i$ and $z_j$ represent the embeddings of two augmented versions of the same file graph, constituting a positive pair; $z_i$ and $z_k$ represent embeddings from different file graphs, constituting negative pairs; sim(•) is a similarity metric (such as, e.g., cosine similarity); $\tau$ represents a temperature parameter controlling the separation sharpness; and $\|/_{[k \neq i]}$ represents an indicator function, equal to 1 if $k \neq i$.

Such a loss function encourages the model to learn one or more embeddings that are close for positive pairs and distant for negative pairs, capturing one or more details of the file's content and structure.

By capturing nuanced relationships within files and between different files, at least one embodiment includes generating and/or implementing a robust mechanism for file similarity assessment and retrieval. More particularly, such an embodiment includes implementing at least one variable-size chunking algorithm and content-based relationship modeling techniques that together enable an improved representation of files as graphs. Further, such an embodiment includes implementing and/or utilizing at least one context-aware graph neural network, which leverages one or more attention mechanisms and dynamic edge modeling to process graph structures, extracting one or more content-aware embeddings. Additionally, such an embodiment includes formulating and/or implementing at least one unsupervised learning strategy that utilizes contrastive learning with content modification to refine the one or more content-aware embeddings, ensuring such embeddings accurately reflect semantic and structural properties of the file(s).

FIG. 4 is a flow diagram of a process for performing digital file analysis using graph-based representations and machine learning techniques in an illustrative embodiment. It is to be understood that this particular process is only an example, and additional or alternative processes can be carried out in other embodiments.

In this embodiment, the process includes steps 400 through 408. These steps are assumed to be performed by the digital file analysis system 105 utilizing elements 112, 114, 116 and 118.

Step 400 includes segmenting at least one digital file into multiple variable-sized portions. In at least one embodiment, segmenting at least one digital file into multiple variable-sized portions includes processing the at least one digital file using at least one variable-size chunking algorithm.

Step 402 includes determining one or more content-based relationships across at least a portion of the multiple variable-sized portions of the at least one digital file. In one or more embodiments, determining one or more content-based relationships across at least a portion of the multiple variable-sized portions of the at least one digital file includes processing the at least a portion of the multiple variable-sized portions of the at least one digital file using one or more content-based relationship modeling techniques.

Step 404 includes generating at least one graph representation of the at least one digital file based at least in part on the one or more content-based relationships and the at least a portion of the multiple variable-sized portions of the at least one digital file. In at least one embodiment, generating at least one graph representation of the at least one digital file includes processing the one or more content-based relationships and the at least a portion of the multiple variable-sized portions of the at least one digital file using at least one graph construction algorithm.

Step 406 includes processing one or more portions of the at least one graph representation using one or more machine learning techniques. In one or more embodiments, processing one or more portions of the at least one graph representation using one or more machine learning techniques includes extracting one or more content-aware embeddings from the one or more portions of the at least one graph representation by processing the one or more portions of the at least one graph representation using at least one context-aware graph neural network. In such an embodiment, processing the one or more portions of the at least one graph representation using at least one context-aware graph neural network can include processing the one or more portions of the at least one graph representation using the at least one context-aware graph neural network in conjunction with one or more attention mechanisms and one or more dynamic edge modeling techniques.

Step 408 includes analyzing the at least one digital file based at least in part on results of processing the one or more portions of the at least one graph representation using the one or more machine learning techniques. In at least one embodiment, analyzing the at least one digital file comprises processing the one or more content-aware embeddings. Additionally or alternatively, analyzing the at least one digital file can include performing digital file similarity analysis across portions of the at least one digital file based at least in part on results of processing the one or more portions of the at least one graph representation using the one or more machine learning techniques.

In one or more embodiments, the techniques depicted in FIG. 4 also include automatically training at least a portion of the one or more machine learning techniques using one or more contrastive learning techniques. In such an embodiment, automatically training at least a portion of the one or more machine learning techniques using one or more contrastive learning techniques can include training at least one context-aware graph neural network in an unsupervised manner using the one or more contrastive learning techniques in conjunction with one or more modified versions of the at least one graph representation.

Accordingly, the particular processing operations and other functionality described in conjunction with the flow diagram of FIG. 4 are presented by way of illustrative example only, and should not be construed as limiting the scope of the disclosure in any way. For example, the ordering of the process steps may be varied in other embodiments, or certain steps may be performed concurrently with one another rather than serially.

The above-described illustrative embodiments provide significant advantages relative to conventional approaches. For example, some embodiments are configured to perform digital file analysis using graph-based representations and machine learning techniques. These and other embodiments can effectively overcome problems associated with computationally expensive methods which require large amounts of labeled data.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As mentioned previously, at least portions of the information processing system 100 can be implemented using one or more processing platforms. A given processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components, or portions thereof, are illustratively implemented for use by tenants of such a multi-tenant environment.

As mentioned previously, cloud infrastructure as disclosed herein can include cloud-based systems. Virtual machines provided in such systems can be used to implement at least portions of a computer system in illustrative embodiments.

In some embodiments, the cloud infrastructure additionally or alternatively comprises a plurality of containers implemented using container host devices. For example, as detailed herein, a given container of cloud infrastructure illustratively comprises a Docker container or other type of Linux Container (LXC). The containers are run on virtual machines in a multi-tenant environment, although other arrangements are possible. The containers are utilized to implement a variety of different types of functionality within the system 100. For example, containers can be used to implement respective processing devices providing compute and/or storage services of a cloud-based system. Again, containers may be used in combination with other virtualization infrastructure such as virtual machines implemented using a hypervisor.

Illustrative embodiments of processing platforms will now be described in greater detail with reference to FIGS. 5 and 6. Although described in the context of system 100, these platforms may also be used to implement at least portions of other information processing systems in other embodiments.

Figure 5:
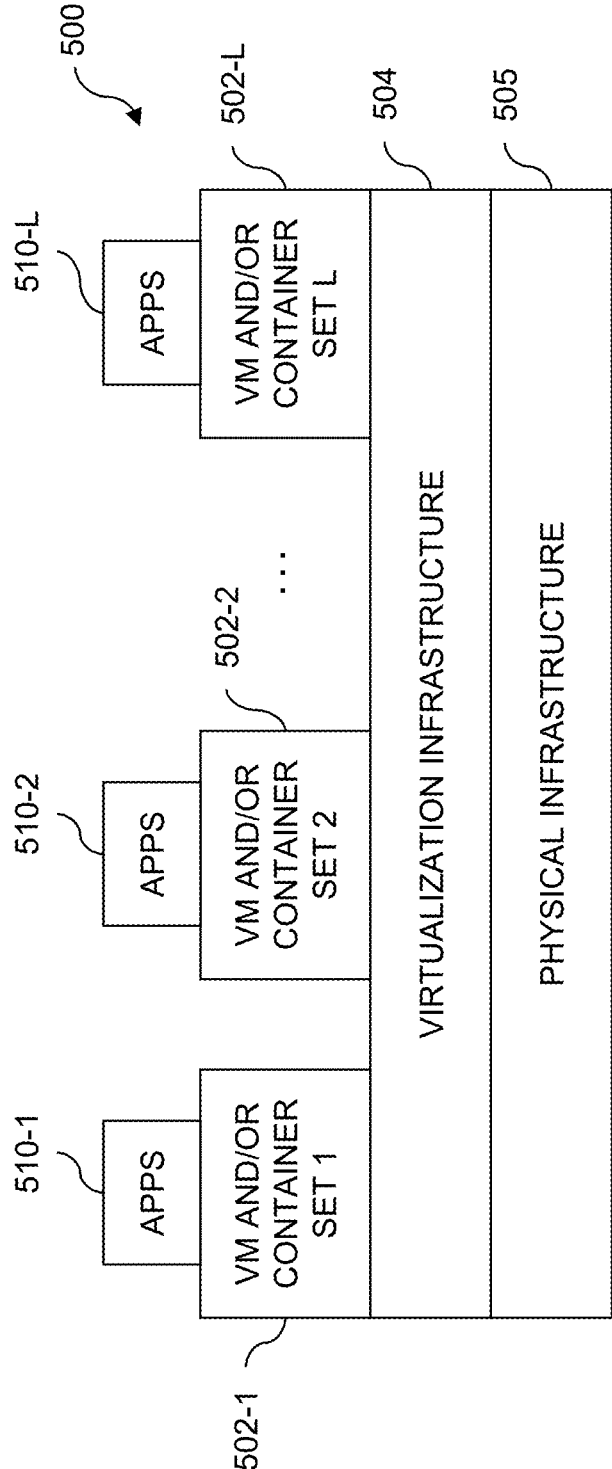
FIGS. 5 and 6 show examples of processing platforms that may be utilized to implement at least a portion of an information processing system in illustrative embodiments.
Figure 6:
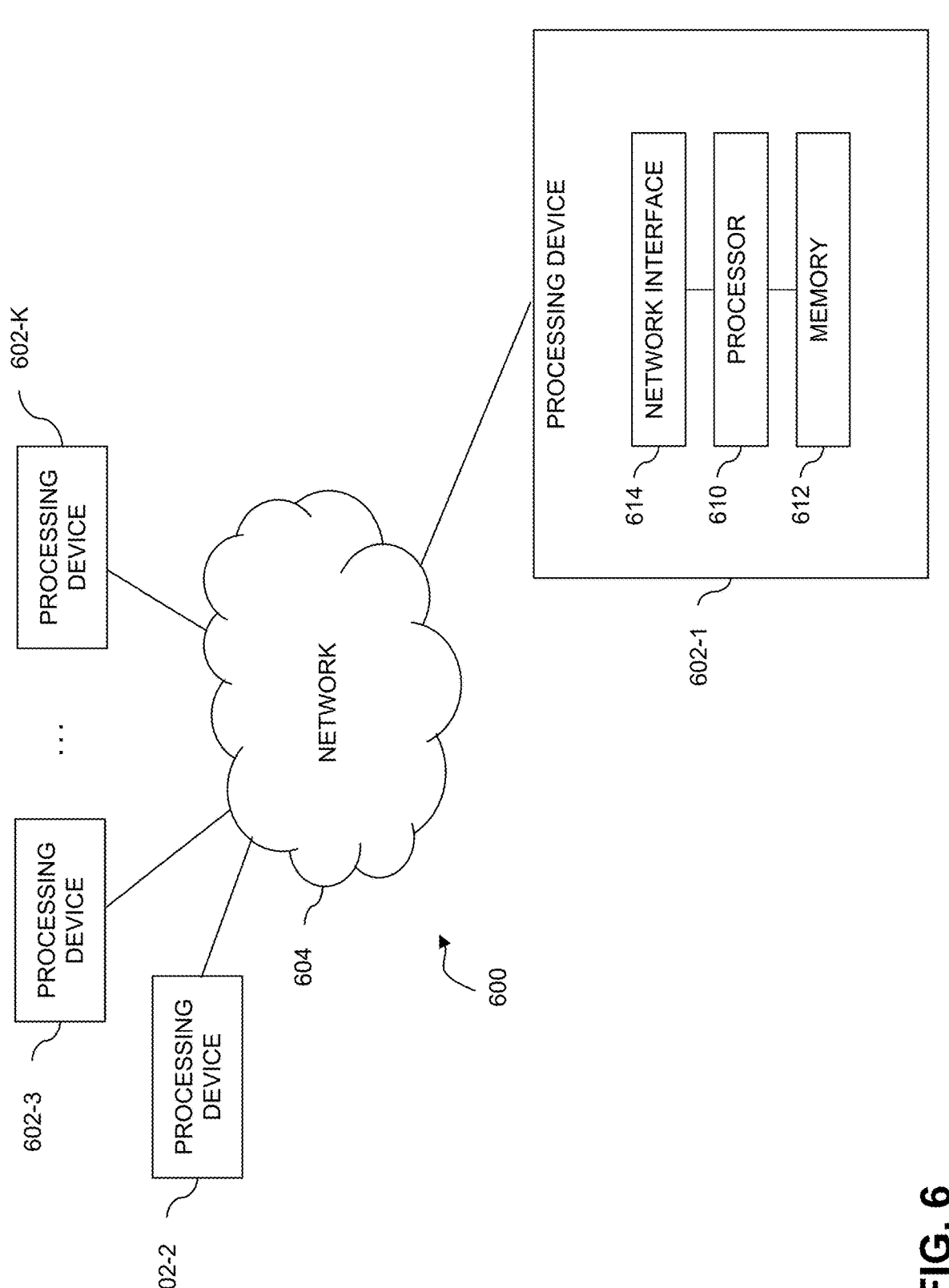

FIG. 5 shows an example processing platform comprising cloud infrastructure 500. The cloud infrastructure 500 comprises a combination of physical and virtual processing resources that are utilized to implement at least a portion of the information processing system 100. The cloud infrastructure 500 comprises multiple virtual machines (VMs) and/or container sets 502-1, 502-2, . . . 502-L implemented using virtualization infrastructure 504. The virtualization infrastructure 504 runs on physical infrastructure 505, and illustratively comprises one or more hypervisors and/or operating system level virtualization infrastructure. The operating system level virtualization infrastructure illustratively comprises kernel control groups of a Linux operating system or other type of operating system.

The cloud infrastructure 500 further comprises sets of applications 510-1, 510-2, . . . 510-L running on respective ones of the VMs/container sets 502-1, 502-2, . . . 502-L under the control of the virtualization infrastructure 504. The VMs/container sets 502 comprise respective VMs, respective sets of one or more containers, or respective sets of one or more containers running in VMs. In some implementations of the FIG. 5 embodiment, the VMs/container sets 502 comprise respective VMs implemented using virtualization infrastructure 504 that comprises at least one hypervisor.

A hypervisor platform may be used to implement a hypervisor within the virtualization infrastructure 504, wherein the hypervisor platform has an associated virtual infrastructure management system. The underlying physical machines comprise one or more information processing platforms that include one or more storage systems.

In other implementations of the FIG. 5 embodiment, the VMs/container sets 502 comprise respective containers implemented using virtualization infrastructure 504 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element is viewed as an example of what is more generally referred to herein as a "processing device." The cloud infrastructure 500 shown in FIG. 5 may represent at least a portion of one processing platform. Another example of such a processing platform is processing platform 600 shown in FIG. 6.

The processing platform 600 in this embodiment comprises a portion of system 100 and includes a plurality of processing devices, denoted 602-1, 602-2, 602-3, . . . 602-K, which communicate with one another over a network 604.

The network 604 comprises any type of network, including by way of example a global computer network such as the Internet, a WAN, a LAN, a satellite network, a telephone or cable network, a cellular network, a wireless network such as a Wi-Fi or WiMAX network, or various portions or combinations of these and other types of networks.

The processing device 602-1 in the processing platform 600 comprises a processor 610 coupled to a memory 612.

The processor 610 comprises a microprocessor, a CPU, a GPU, a TPU, a microcontroller, an ASIC, a FPGA or other type of processing circuitry, as well as portions or combinations of such circuitry elements.

The memory 612 comprises RAM, ROM or other types of memory, in any combination. The memory 612 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture comprises, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 602-1 is network interface circuitry 614, which is used to interface the processing device with the network 604 and other system components, and may comprise conventional transceivers.

The other processing devices 602 of the processing platform 600 are assumed to be configured in a manner similar to that shown for processing device 602-1 in the figure.

Again, the particular processing platform 600 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage products or devices, or other components are possible in the information processing system 100. Such components can communicate with other elements of the information processing system 100 over any type of network or other communication media.

For example, particular types of storage products that can be used in implementing a given storage system of an information processing system in an illustrative embodiment include all-flash and hybrid flash storage arrays, scale-out all-flash storage arrays, scale-out NAS clusters, or other types of storage arrays. Combinations of multiple ones of these and other storage products can also be used in implementing a given storage system in an illustrative embodiment.

It should again be emphasized that the above-described embodiments are presented for purposes of illustration only. Many variations and other alternative embodiments may be used. Also, the particular configurations of system and device elements and associated processing operations illustratively shown in the drawings can be varied in other embodiments. Thus, for example, the particular types of processing devices, modules, systems and resources deployed in a given embodiment and their respective configurations may be varied. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A computer-implemented method comprising:
   segmenting at least one digital file into multiple variable-sized portions by identifying portion boundaries within the at least one digital file using at least one rolling hash function, wherein using the at least one rolling hash function comprises:
      moving a processing window of a designated size, across multiple steps, through at least parts of the at least one digital file;
      calculating at least one hash value for contents of the processing window at at least a portion of the multiple steps;
      marking at least part of the portion boundaries in response to determining that the at least one hash value corresponds to at least one designated condition; and
      defining the multiple variable-sized portions based at least in part on the marking of the at least part of the portion boundaries;
   determining one or more content-based relationships across at least a portion of the multiple variable-sized portions of the at least one digital file;
   generating at least one graph representation of the at least one digital file based at least in part on the one or more content-based relationships and the at least a portion of the multiple variable-sized portions of the at least one digital file;
   configuring a processor-based machine learning system to process one or more portions of the at least one graph representation, the processor-based machine learning system comprising at least one context-aware graph neural network and a contrastive learning network;
   processing the one or more portions of the at least one graph representation in the processor-based machine learning system, wherein processing the one or more portions of the at least one graph representation in the processor-based machine learning system comprises encoding one or more relationships between content of the at least one digital file and structure of the at least one digital file by processing the one or more portions of the at least one graph representation using the at least one context-aware graph neural network in conjunction with one or more attention mechanism layers and one or more dynamic edge modeling techniques, the encoding further comprising:
      (i) implementing the at least one context-aware graph neural network to generate one or more content-aware embeddings, and wherein the at least one content-aware graph neural network comprises, connected in series:
         (a) an input layer configured to receive node features derived from content of the multiple variable-sized portions of the at least one digital file, the node features comprising at least one of statistical properties, hash-based representations, and content embeddings of the respective ones of the multiple variable-sized portions, and the input layer having an output coupled to an input of one or more graph convolutional layers;
         (b) the one or more graph convolutional layers, each connected in series after the input layer, each of the one or more graph convolutional layers being configured to compute, for each of a plurality of nodes of the at least one graph representation, an updated node feature vector by performing a weighted aggregation of feature vectors of neighboring nodes, wherein the weighted aggregation uses at least one size-aware weighting factor and at least one content-similarity weight, and each of the one or more graph convolutional layers having an output coupled to an input of the one or more attention mechanism layers connected in series after the one or more graph convolutional layers;
         (c) the one or more attention mechanism layers configured to compute, for one or more pairs of connected nodes among the plurality of nodes, one or more attention coefficients, wherein each of the one or more attention mechanism layers has an output that is coupled to an input of at least one pooling layer connected in series after the one or more attention mechanism layers; and
         (d) the at least one pooling layer configured to adaptively aggregate node feature vectors across the plurality of nodes of the at least one graph representation to produce the one or more content-aware embeddings at a network output of the at least one content-aware graph neural network, the network output of the at least one content-aware graph neural network being coupled to an input of a digital file analysis engine; and
      (ii) implementing the contrastive learning network to:
         generate, from the at least one graph representation, at least a plurality of augmented graph representations; and
         provide a training signal at a training output of the contrastive learning network, the training output of the contrastive learning network being coupled to an input of the at least one content-aware graph neural network such that the contrastive learning network and the at least one content-aware graph neural network form a closed training loop operating in parallel with an inference path of the at least one content-aware graph neural network; and performing one or more automated actions in connection with at least one data backup system by performing digital file similarity analysis across portions of the at least one digital file based at least in part on results of the processing of the one or more portions of the at least one graph representation, and wherein performing digital file similarity analysis comprises computing one or more similarity scores from the one or more content-aware embeddings, and generating a control signal based at least in part on the one or more similarity scores, the control signal being coupled to an input of the at least one data backup system separate from the processor-based machine learning system;

wherein the method is performed by at least one processing device comprising a processor coupled to a memory.

2. The computer-implemented method of claim 1, wherein processing one or more portions of the at least one graph representation in the processor-based machine learning system comprises extracting the one or more content-aware embeddings from the one or more portions of the at least one graph representation by processing the one or more portions of the at least one graph representation using the at least one context-aware graph neural network.

3. The computer-implemented method of claim 1, wherein segmenting at least one digital file into multiple variable-sized portions comprises processing the at least one digital file using at least one variable-size chunking algorithm.

4. The computer-implemented method of claim 1, wherein determining one or more content-based relationships across at least a portion of the multiple variable-sized portions of the at least one digital file comprises processing the at least a portion of the multiple variable-sized portions of the at least one digital file using one or more content-based relationship modeling techniques.

5. The computer-implemented method of claim 1, wherein generating at least one graph representation of the at least one digital file comprises processing the one or more content-based relationships and the at least a portion of the multiple variable-sized portions of the at least one digital file using at least one graph construction algorithm.

6. A non-transitory processor-readable storage medium having stored therein program code of one or more software programs, wherein the program code when executed by at least one processing device causes the at least one processing device:

to segment at least one digital file into multiple variable-sized portions by identifying portion boundaries within the at least one digital file using at least one rolling hash function, wherein using the at least one rolling hash function comprises:

moving a processing window of a designated size, across multiple steps, through at least parts of the at least one digital file;

calculating at least one hash value for contents of the processing window at at least a portion of the multiple steps;

marking at least part of the portion boundaries in response to determining that the at least one hash value corresponds to at least one designated condition; and defining the multiple variable-sized portions based at least in part on the marking of the at least part of the portion boundaries;

to determine one or more content-based relationships across at least a portion of the multiple variable-sized portions of the at least one digital file;

to generate at least one graph representation of the at least one digital file based at least in part on the one or more content-based relationships and the at least a portion of the multiple variable-sized portions of the at least one digital file;

to configure a processor-based machine learning system to process one or more portions of the at least one graph representation, the processor-based machine learning system comprising at least one context-aware graph neural network and a contrastive learning network;

to process the one or more portions of the at least one graph representation in the processor-based machine learning system, wherein processing the one or more portions of the at least one graph representation in the processor-based machine learning system comprises encoding one or more relationships between content of the at least one digital file and structure of the at least one digital file by processing the one or more portions of the at least one graph representation using the at least one context-aware graph neural network in conjunction with one or more attention mechanism layers and one or more dynamic edge modeling techniques, the encoding further comprising:

(i) implementing the at least one context-aware graph neural network to generate one or more content-aware embeddings, and wherein the at least one content-aware graph neural network comprises, connected in series:

(a) an input layer configured to receive node features derived from content of the multiple variable-sized portions of the at least one digital file, the node features comprising at least one of statistical properties, hash-based representations, and content embeddings of the respective ones of the multiple variable-sized portions, and the input layer having an output coupled to an input of one or more graph convolutional layers;

(b) the one or more graph convolutional layers, each connected in series after the input layer, each of the one or more graph convolutional layers being configured to compute, for each of a plurality of nodes of the at least one graph representation, an updated node feature vector by performing a weighted aggregation of feature vectors of neighboring nodes, wherein the weighted aggregation uses at least one size-aware weighting factor and at least one content-similarity weight, and each of the one or more graph convolutional layers having an output coupled to an input of the one or more attention mechanism layers connected in series after the one or more graph convolutional layers;

(c) the one or more attention mechanism layers configured to compute, for one or more pairs of connected nodes among the plurality of nodes, one or more attention coefficients, wherein each of the one or more attention mechanism layers has an output that is coupled to an input of at least one pooling layer connected in series after the one or more attention mechanism layers; and (d) the at least one pooling layer configured to adaptively aggregate node feature vectors across the plurality of nodes of the at least one graph representation to produce the one or more content-aware embeddings at a network output of the at least one content-aware graph neural network, the network output of the at least one content-aware graph neural network being coupled to an input of a digital file analysis engine; and (ii) implementing the contrastive learning network to:

generate, from the at least one graph representation, at least a plurality of augmented graph representations; and provide a training signal at a training output of the contrastive learning network, the training output of the contrastive learning network being coupled to an input of the at least one content-aware graph neural network such that the contrastive learning network and the at least one content-aware graph neural network form a closed training loop operating in parallel with an inference path of the at least one content-aware graph neural network; and to perform one or more automated actions in connection with at least one data backup system by performing digital file similarity analysis across portions of the at least one digital file based at least in part on results of the processing of the one or more portions of the at least one graph representation, and wherein performing digital file similarity analysis comprises computing one or more similarity scores from the one or more content-aware embeddings, and generating a control signal based at least in part on the one or more similarity scores, the control signal being coupled to an input of the at least one data backup system separate from the processor-based machine learning system.

7. The non-transitory processor-readable storage medium of claim 6, wherein processing one or more portions of the at least one graph representation in the processor-based machine learning system comprises extracting the one or more content-aware embeddings from the one or more portions of the at least one graph representation by processing the one or more portions of the at least one graph representation using the at least one context-aware graph neural network.

8. An apparatus comprising:

at least one processing device comprising a processor coupled to a memory;

the at least one processing device being configured:

to segment at least one digital file into multiple variable-sized portions by identifying portion boundaries within the at least one digital file using at least one rolling hash function, wherein using the at least one rolling hash function comprises:

moving a processing window of a designated size, across multiple steps, through at least parts of the at least one digital file;

calculating at least one hash value for contents of the processing window at at least a portion of the multiple steps;

marking at least part of the portion boundaries in response to determining that the at least one hash value corresponds to at least one designated condition; and defining the multiple variable-sized portions based at least in part on the marking of the at least part of the portion boundaries;

to determine one or more content-based relationships across at least a portion of the multiple variable-sized portions of the at least one digital file;

to generate at least one graph representation of the at least one digital file based at least in part on the one or more content-based relationships and the at least a portion of the multiple variable-sized portions of the at least one digital file;

to configure a processor-based machine learning system to process one or more portions of the at least one graph representation, the processor-based machine learning system comprising at least one context-aware graph neural network and a contrastive learning network;

to process the one or more portions of the at least one graph representation in the processor-based machine learning system, wherein processing the one or more portions of the at least one graph representation in the processor-based machine learning system comprises encoding one or more relationships between content of the at least one digital file and structure of the at least one digital file by processing the one or more portions of the at least one graph representation using the at least one context-aware graph neural network in conjunction with one or more attention mechanism layers and one or more dynamic edge modeling techniques, the encoding further comprising:

(i) implementing the at least one context-aware graph neural network to generate one or more content-aware embeddings, and wherein the at least one content-aware graph neural network comprises, connected in series:

(a) an input layer configured to receive node features derived from content of the multiple variable-sized portions of the at least one digital file, the node features comprising at least one of statistical properties, hash-based representations, and content embeddings of the respective ones of the multiple variable-sized portions, and the input layer having an output coupled to an input of one or more graph convolutional layers;

(b) the one or more graph convolutional layers, each connected in series after the input layer, each of the one or more graph convolutional layers being configured to compute, for each of a plurality of nodes of the at least one graph representation, an updated node feature vector by performing a weighted aggregation of feature vectors of neighboring nodes, wherein the weighted aggregation uses at least one size-aware weighting factor and at least one content-similarity weight, and each of the one or more graph convolutional layers having an output coupled to an input of the one or more attention mechanism layers connected in series after the one or more graph convolutional layers;

(c) the one or more attention mechanism layers configured to compute, for one or more pairs of connected nodes among the plurality of nodes, one or more attention coefficients, wherein each of the one or more attention mechanism layers has an output that is coupled to an input of at least one pooling layer connected in series after the one or more attention mechanism layers; and (d) the at least one pooling layer configured to adaptively aggregate node feature vectors across the plurality of nodes of the at least one graph representation to produce the one or more content-aware embeddings at a network output of the at least one content-aware graph neural network, the network output of the at least one content-aware graph neural network being coupled to an input of a digital file analysis engine; and (ii) implementing the contrastive learning network to:

generate, from the at least one graph representation, at least a plurality of augmented graph representations; and provide a training signal at a training output of the contrastive learning network, the training output of the contrastive learning network being coupled to an input of the at least one content-aware graph neural network such that the contrastive learning network and the at least one content-aware graph neural network form a closed training loop operating in parallel with an inference path of the at least one content-aware graph neural network; and to perform one or more automated actions in connection with at least one data backup system by performing digital file similarity analysis across portions of the at least one digital file based at least in part on results of the processing of the one or more portions of the at least one graph representation, and wherein performing digital file similarity analysis comprises computing one or more similarity scores from the one or more content-aware embeddings, and generating a control signal based at least in part on the one or more similarity scores, the control signal being coupled to an input of the at least one data backup system separate from the processor-based machine learning system.

9. The apparatus of claim 8, wherein processing one or more portions of the at least one graph representation in the processor-based machine learning system comprises extracting the one or more content-aware embeddings from the one or more portions of the at least one graph representation by processing the one or more portions of the at least one graph representation using the at least one context-aware graph neural network.

10. The apparatus of claim 8, wherein segmenting at least one digital file into multiple variable-sized portions comprises processing the at least one digital file using at least one variable-size chunking algorithm.

11. The apparatus of claim 8, wherein determining one or more content-based relationships across at least a portion of the multiple variable-sized portions of the at least one digital file comprises processing the at least a portion of the multiple variable-sized portions of the at least one digital file using one or more content-based relationship modeling techniques.

12. The apparatus of claim 8, wherein generating at least one graph representation of the at least one digital file comprises processing the one or more content-based relationships and the at least a portion of the multiple variable-sized portions of the at least one digital file using at least one graph construction algorithm.

13. The non-transitory processor-readable storage medium of claim 6, wherein segmenting at least one digital file into multiple variable-sized portions comprises processing the at least one digital file using at least one variable-size chunking algorithm.

14. The non-transitory processor-readable storage medium of claim 6, wherein determining one or more content-based relationships across at least a portion of the multiple variable-sized portions of the at least one digital file comprises processing the at least a portion of the multiple variable-sized portions of the at least one digital file using one or more content-based relationship modeling techniques.

15. The non-transitory processor-readable storage medium of claim 6, wherein generating at least one graph representation of the at least one digital file comprises processing the one or more content-based relationships and the at least a portion of the multiple variable-sized portions of the at least one digital file using at least one graph construction algorithm.

* * * * *